United States Patent [19]
Altmanshofer
[11] 3,742,126
[45] June 26, 1973

[54] AMPLITUDE CONTROL CIRCUITS

[75] Inventor: Robert Dale Altmanshofer, Indianapolis, Ind.
[73] Assignee: RCA Corporation, New York, N.Y.

[22] Filed: Apr. 28, 1971
[21] Appl. No.: 138,294

Related U.S. Application Data
[62] Division of Ser. No. 829,510, June 2, 1969.

[52] U.S. Cl.... 178/5.4 R, 178/5.4 MC, 178/5.4 CK
[51] Int. Cl. .............................................. H04n 9/48
[58] Field of Search........................ 178/5.4, 5.4 MC, 178/5.4 AC, 5.4 CK

[56] References Cited
UNITED STATES PATENTS
3,272,915 9/1966 Theriault........................ 178/5.4 AC
3,595,992 7/1971 Poppy ........................... 178/5.4 AC Primary Examiner—Richard Murray
Attorney—Eugene M. Whitacre

[57] ABSTRACT
A common base amplifier is interposed in a chrominance processing amplifier chain and couples a first selective amplifier, included in said chain, to suitable output means. A unidirectional current device coupled to the low impedance input terminal of the common base stage, exhibits a varying impedance in accordance with a varying current flowing therethrough, which current variation is provided by suitable means coupled to said unidirectional device and responsive to varying d.c. control voltags. The varying impedance of the unidirectional device controls the amplitude of the sggnal applied from the first selective amplifier via the common base stage to the output means.

5 Claims, 2 Drawing Figures

AMPLITUDE CONTROL CIRCUITS

This is a division of application Ser. No. 829,510, filed June 2, 1969.

This invention relates to signal amplitude control circuitry and more particularly to d.c. operated chrominance amplitude control circuits suitable for use in a television receiver.

Most conventional television receivers include a control which serves to vary the amplitude of the signals in the chrominance channel of the receiver to enable the viewer to provide an optimumly, saturated color display. Such controls, are typically potentiometers which when manually rotated, serve to attenuate the signal to, or change the bias of, a suitable amplifying stage to decrease or increase the amplitude of the output signal.

In remote controlled receivers the chrominance control may be rotated by means of a motor or other electromechanical device which is, activated under the control of a remotely located transmitter. In such instances the potentiometer is varied, or rotated, by the motor action instead of by direct manual operation.

Recently, efforts concerning remote operated television receivers have resulted in receiving units which eliminate the necessity of motors or comparable electromechanical devices. Such units, for example, may utilize field effect transistors and capacitors arranged in memory information storing networks. In such networks d.c. voltages corresponding to a desired setting for, chrominance amplitude control, video amplitude control, channel selection, and so on, are retained by the storing network located in the receiver. The stored d.c. level is then utilized to control the appropriate functions. In using such memory storage networks, mechanical variations and mechanical positioning of components is not desirable or easily implemented. Accordingly, variable impedance control networks used for signal amplitude control or otherwise, existing in a modern television receiver, preferably would be voltage or current responsive. Many such voltage or current responsive elements are known, in the prior art, such as the transistor, the variable reactance diode and so on. Irrespective of the type of device utilized for such control an important consideration arises when one desires to vary amplitude in the chrominance channel. Such a consideration involves the very nature of the high frequency chrominance signals. While the amplitude of such signals is determinative of color saturation, the phase of such signals is determinative of hue. Therefore, when one adjusts amplitude one expects a desired change in color saturation, and does not necessarily expect an undesired change in hue.

Many prior art configurations utilized to effect such amplitude changes, also result in producing phase changes as a function of the amplitude setting. Still other circuits operating with relatively large chrominance signals would "swing" or bias the controlled chrominance amplifier stage into a class C or other non-linear mode, producing inoptimumly saturated colors, not truly representative of the transmitted scene.

It is therefore an object of the present invention to provide an improved amplitude control circuit operated by a d.c. signal for varying the amplitude of signals in a predetermined frequency band without substantially affecting the phase thereof.

A further object is to provide a d.c. operated amplitude control circuit using no mechanical components for varying the amplitude of chrominance subcarrier frequency signals in a color television receiver.

These and other objects of the present invention are accomplished in one embodiment by utilizing a common base transistor amplifier interposed in cascade with a selective amplifier. The low input impedance terminal of the common base amplifier is coupled to the output terminal of the selective amplifier, a variable impedance device is coupled between the emitter electrode of the common base stage and a point of reference potential. The variable impedance device exhibits impedance changes according to the current flowing therethrough, which current is controlled by means coupled to said device and operable by a d.c. control signal. Changes in the impedance serve to vary the amplitude of the frequency signal applied to the emitter electrode of the common base amplifier without substantially varying the phase.

These and other objects will become clearer if reference is made to the foregoing specification when read in conjunction with the accompany figures, in which.

Figure 1:
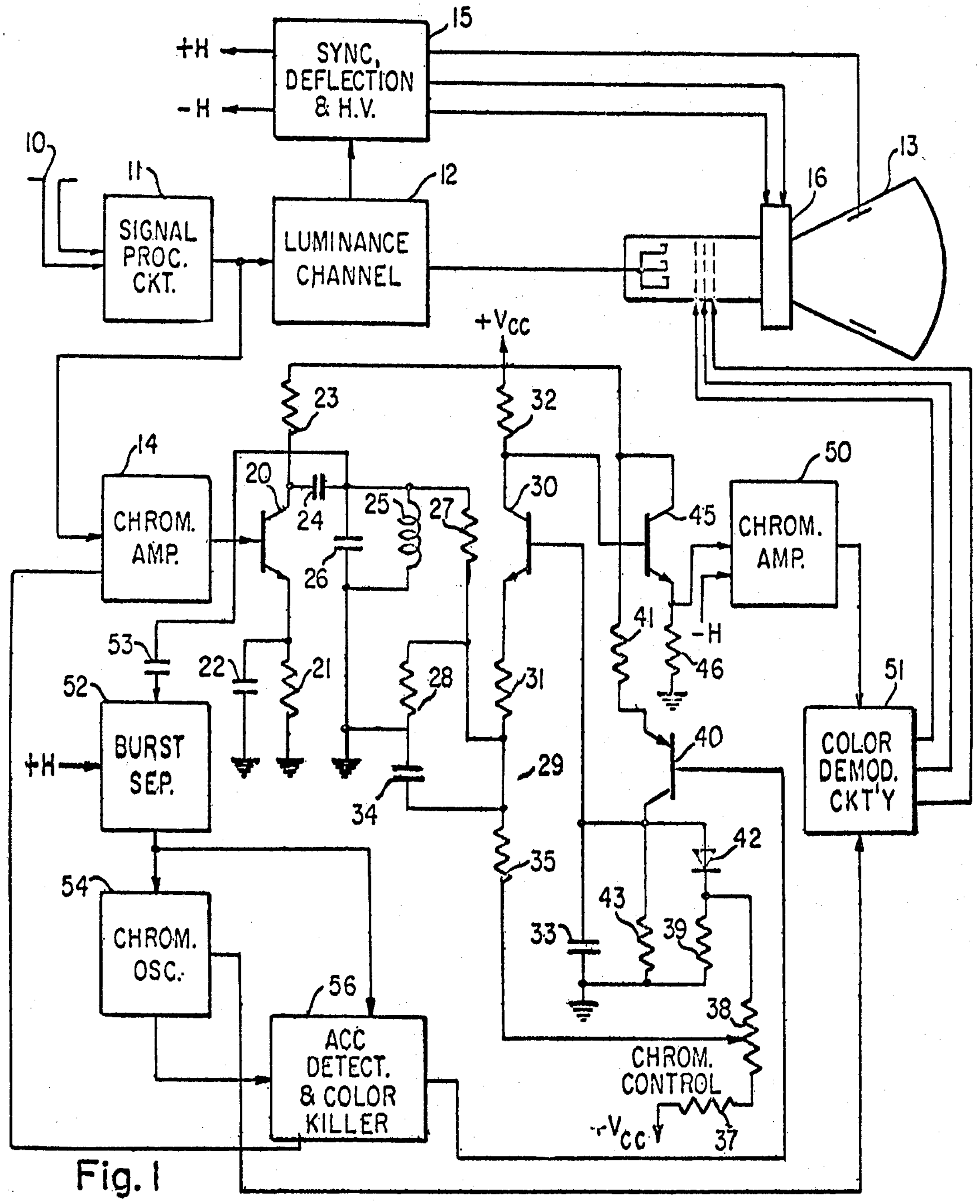
FIG. 1 is a schematic diagram partially in block form of chrominance signal processing circuitry including an amplitude control according to the invention.

Referring to FIG. 1, there is shown a schematic diagram partially in block form of a television receiver utilizing a direct current (d.c.) controlled, chroma amplitude circuit according to this invention.

A television antenna 10 is adapted to receive radio frequency signal transmissions in the television band, and couple such signals to the input terminals of a signal processing circuit 11. Circuit 11 conventionally select and processes the RF signals to provide a demodulated video signal containing information pertinent to the final display content, including synchronization and other information. The video signal containing information pertinent to the monochrome content of the transmitted scene is conventionally applied to the luminance amplifier channel 12 having an output for driving a color kinescope display device 13. Output signals from the luminance channel 12 are applied to synchronization, deflection and high voltage generating circuitry 15, to assure the formulation of a stable raster by the kinescope 13, in providing synchronized vertical and horizontal waveshapes to the deflection coil 16 associated with the kinescope 13. The circuitry 15 further provides suitable operating potentials for the kinescope 13, which may be a three gun shadow mask device.

The video signal is further coupled to a chrominance channel having a chrominance amplifier stage 14 for processing and amplifying the higher frequency components of the composite signal, containing the chrominance sidebands transmitted with the composite signal during a color transmission. An output terminal from the first chrominance amplifier 14 is coupled to the base electrode of a chrominance amplifier transistor 20, arranged in a common emitter configuration. Transistor 20 has the emitter electrode coupled to a point of reference potential, such as ground, through a resistor 21 which is bypassed at chrominance frequencies by a capacitor 22.

The collector electrode of transistor 20 is returned to a suitable source of operating potential designated as $+V_{cc}$ through a current limiting and load resistor 23. The collector electrode is further coupled through a capacitor 24 to a parallel tank circuit, comprising an inductor 25 in shunt with a capacitor 26. The tank circuit has one terminal coupled to capacitor 24 and the other terminal coupled to the point of reference potential, and is chosen to select the chrominance subcarrier sideband frequencies. In parallel with the tank circuit is a series network comprising resistors 27 and 28. The junction between resistors 27 and 28 is coupled to the cathode of a diode 29, and to the emitter electrode of a controllable transistor 30 through a resistor 31. Transistor 30 is arranged in a common base configuration and has the collector electrode returned to the $+V_{cc}$ supply through a current limiting resistor 32.

The base electrode of transistor 30 is bypassed at chrominance frequencies to ground by means of the capacitor 33. The anode of diode 29, having its cathode coupled to the emitter of transistor 30, is bypassed by a.c. signals by capacitor 34 coupled between the anode and a point of reference potential. A d.c. connection to the anode of diode 29 is through resistor 35 to a voltage divider comprising the series combination of resistors 37, 38 and 39, coupled between the $+V_{cc}$ supply and a point of reference potential. Resistor 38 is a potentiometer having its adjustable arm coupled to resistor 35. A base-biasing voltage for transistor 30 is provided by a transistor 40 having the emitter electrode coupled to the $+V_{cc}$ supply through a resistor 41, and having its collector electrode coupled to the junction between resistors 38 and 39 through a semiconductor diode 42.

The collector electrode of transistor 40 is further coupled to the base electrode of transistor 30, and returned to ground through a load resistor 43.

The collector electrode of the common base amplifier 30 is coupled to the base electrode of a transistor 45 arranged in an emitter follower configuration, having the collector electrode coupled to the $+V_{cc}$ supply and the emitter electrode returned to ground through resistor 46. The emitter electrode of transistor 45 is coupled to the chrominance amplifier 50 which in turn is coupled to color demodulator circuits 51.

A burst separator circuit 52 has an input terminal coupled to the output terminal of the chrominance amplifier 20 through a capacitor 53. A suitable pulse (+H) derived from the synchronizing circuitry 15 is applied to another input terminal of the burst separator 52 to separate the burst from the remainder of the transmitted color signal. The burst signal, being representative of the frequency and phase of the chrominance subcarrier wave, is used to synchronize a chrominance oscillator circuit 54. The burst locked output of the chrominance oscillator 54 is then applied to another input terminal of color demodulating circuitry 51 to obtain appropriate color information signals suitable for application to the kinescope 16.

The chrominance oscillator wave and the separated color burst signal are applied to an (automatic chroma control) ACC detector and color killer stage 56. An ACC voltage which has a magnitude dependent upon the amplitude of the burst signal is developed at a terminal X, and applied by connections not shown to a corresponding terminal X of the chrominance amplifier to control its gain as an inverse function of burst amplitude. A color killer voltage is also developed and applied to the transistor 40. In the absence of burst, or when the color burst and the chrominance oscillator waves do not bear a prescribed phase relation, the color killer voltage applied to amplifier 40 is of a polarity and magnitude to decrease conduction in that stage and disable the chrominance amplifying channel as will be explained.

The chrominance amplifiers 14 and 20 amplify those portions of the composite video signal frequency spectrum occupied by the chrominance subcarrier sidebands. The amplified chrominance sidebands are developed across the tuned circuit 25–26 and applied through an isolating resistor 27 to the emitter electrode of the common base stage 30. The common base stage, which is biased for high voltage gain linear amplification during reception of color television signals is cutoff during reception of monochrome television signals.

Signals developed across the load resistor 32 are coupled to the common emitter stage 45 which provides impedance isolation between the common base stage 30 and the subsequent chrominance amplifier 50.

The viewer operated chroma or color control comprises the potentiometer 38, adjustment of which operates to alter the amplitude of the chrominance sidebands fed to the color demodulator circuitry; and as a result, the color saturation of the reproduced image. As the slider or arm on the potentiometer 38 is moved toward the resistor 37, a more positive voltage is applied to the anode of diode 29 causing it to become more forward biased and exhibit decreased impedance. As a result, the amplitude of the chrominance signals applied to the common base stage 30 is reduced because the voltage divider ratio of the resistor 27 to the resistance of diode 29 (through capacitor 34 to ground) is increased.

In like manner, the amplitude of the chrominance signals applied to the common base stage 30 may be increased by moving the arm of the potentiometer 38 toward the resistor 39. It will be appreciated that the amplitude variation in the chrominance signal is obtained as a function of the DC potential applied to the diode 29 through the resistor 35. These amplitude changes are effected without significant alteration of the phase of the chrominance signal, so that changes in saturation are not accompanied by changes in hue. Phase changes of the chrominance signals are minimized by the low impedances associated with the input circuits of the common base stage 30 in combination with a low impedance of the forward biased diode 29. In addition, the resistor 27 isolates the tank circuit 25–26 from the impedance variations of the diode 29.

During color transmission the ACC detector and color killer circuit 56 applies a negative voltage to the base of transistor amplifier 40 causing that transistor to conduct. The conduction of transistor amplifier 40 causes its collector potential to become more positive until clamped by the diode 42 to the voltage at the junction between the resistors 38 and 39. Thus the voltage at the junction between the resistors 38 and 39 less the voltage drop across the diode 42 establishes the bias for the common base transistor 30. This bias, as mentioned above, is selected to permit linear amplification of the chrominance signals in the common base stage.

During the reception of monochrome signals, the ACC detector and color killer circuit 56 applies a more positive voltage to the transistor amplifier 40 causing it to be cut-off. Under these conditions the common base amplifier 30 is cut-off, thereby blocking or disabling the chrominance signal channel.

Figure 2:
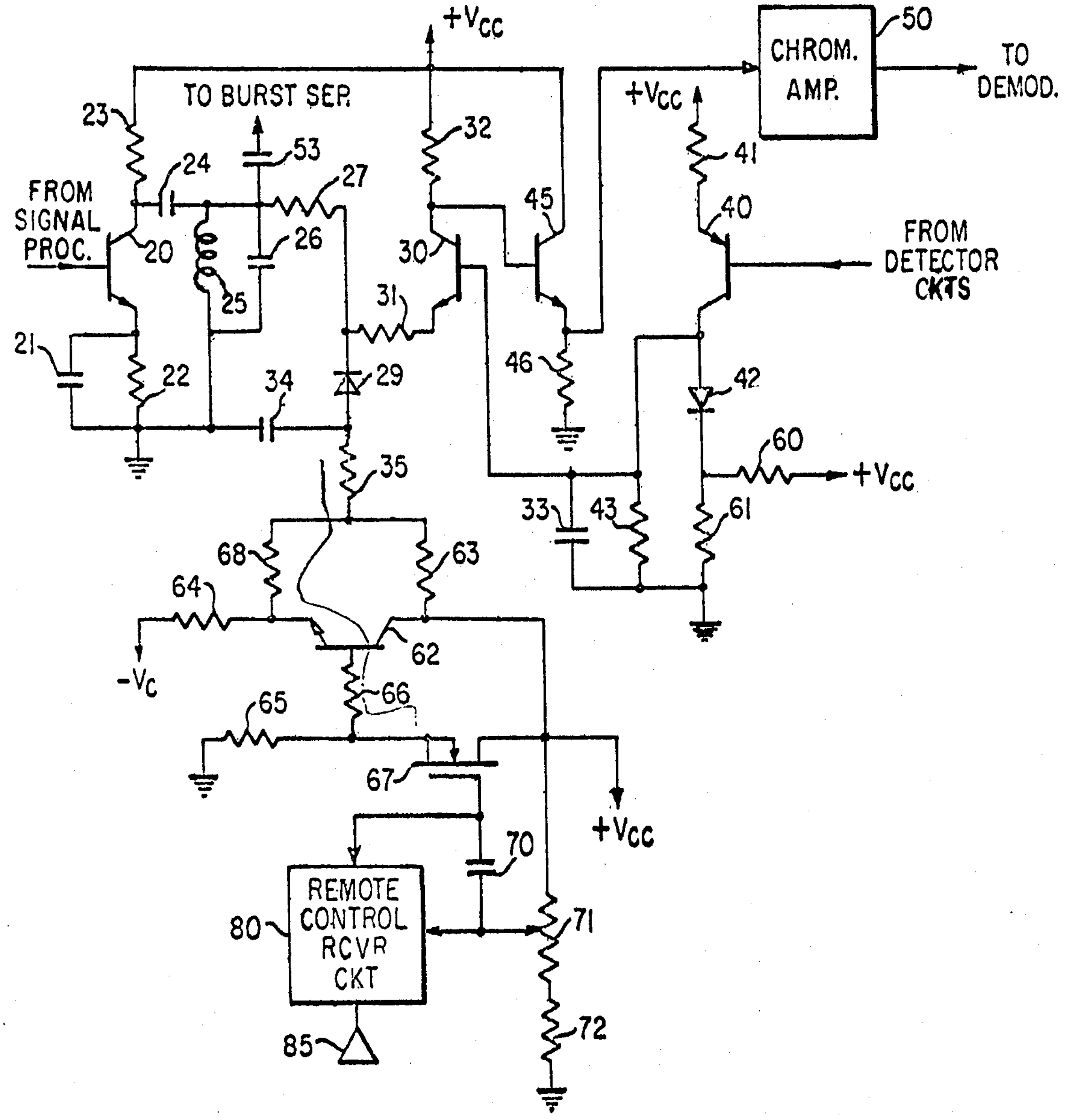
FIG. 2 is a schematic diagram partially in block form of an alternate embodiment of an amplitude control circuit according to the invention.

FIG. 2 is a schematic circuit diagram showing a modification chrominance amplitude control circuit according to this invention. The circuit components shown in FIG. 2, which are the same as those shown in FIG. 1, are identified by the same reference characters. The main difference in the circuit of FIG. 2 is that chrominance control is provided for by a field effect transistor storage network operated from a remote control receiver circuit 80.

The operation of the circuitry is as follows. The chrominance subcarrier frequency components contained in the composite signal are selectively amplified by the common emitter amplifier 20 and are applied to the low input impedance emitter electrode of the common base amplifier 30. As previously indicated, biasing for transistor 30 is obtained from transistor 40 operating to disable the common base stage 30 during monochrome reception and to supply a relatively constant bias to transistor 30 during color reception.

As described for FIG. 1, if diode 29 is not conducting or only slightly conducting the maximum available chrominance signal is applied to the emitter electrode of the chrominance base amplifier 30 and is amplified thereby. The amplified chrominance signal is then further processed by the subsequent amplifier stage including the emitter follower transistor 45, and chrominance amplifier 50. If the viewer desires to alter the effective amplitude of the chrominance signals to effect a change in the saturation of the kinescope display; he may operate a suitable control on a hand-held remote transmitter which emits a suitable radio wave or ultrasonic wave. The transmitted wave is received by an antenna or microphone 85 associated with the remote control receiver circuit 80. The modulation on or frequency of the signal serves to activate appropriate selective networks within the remote control receiver 80 to provide a voltage or control signal proportional to the modulation and determinative of the amount of saturation control desired by the viewer.

This resultant control signal is utilized to charge a capacitor 70 coupled between the remote control receiver 80 and the gate electrode of an insulated gate field effect transistor. Due to the extremely large input impedance of the field effect transistor, any d.c. voltage applied to the gate electrode in this manner from a high impedance source remains at the gate electrode for a relatively long time period (days). Examples of field effect transistors and capacitors to provide long time constant networks for storing charge on a capacitor are known in the art. The potential across the coupling capacitor 70 is determinative of the conduction capabilities of the field effect transistor. The conductivity of the field effect transistor determines the potential across the resistor 65 which in turn establishes the conductivity of the transistor 62.

The collector electrode of transistor 62 is connected to the positive terminal of the operating potential supply $+V_{cc}$ and the emitter electrode of transistor 62 is connected through a resistor 64 to a source of negative potential designated as $-V_c$.

The diode 29 is connected via resistor 35 and a resistor 68 to the emitter electrode of transistor 62, and through resistor 35 and resistor 63 to the $+V_{cc}$ supply terminal.

As the received remote control signal causes the transistors 67 and 62 to become more conductive, a more positive potential is applied to the anode of diode 29, reducing the amplitude of the chrominance signal applied to the common base stage 30. Therefore by varying the voltage across capacitor 70 by means of the remote control capability, briefly described above, the consumer now effects chrominance amplitude control exclusive of any utilization of mechanical components in the receiver.

The divider, comprising resistors 71 and 72 coupled between the $+V_{cc}$ supply and ground and having the variable arm of resistor 71 coupled to a terminal of capacitor 70, is used to adjust the initial operating point of the circuit to accommodate anticipated component tolerance variations.

A circuit shown in FIG. 2 was found to provide satisfactory operation with the following component values, given only by way of example:

| | |
|---|---|
| Resistor **23** | 560 ohms |
| **27** | 1000 ohms |
| Resistor **31** | 39 ohms |
| **32** | 1500 ohms |
| **35** | 10 ohms |
| **41** | 15,000 ohms |
| **43** | 100,000 ohms |
| **46** | 3300 ohms |
| **60** | 2200 ohms |
| **61** | 1200 ohms |
| **63** | 3900 ohms |
| **68** | 2400 ohms |
| **64** | 2200 ohms |
| **66** | 820 ohms |
| **65** | 10,000 ohms |
| **71** | 10,000 ohms (variable) |
| Capacitors **24** | 1000 micromicrofarads |
| **26** | 100 micromicrofarads |
| **33** | 0.01 microfarads |
| **34** | 1.2 microfarads |
| **53** | 1000 micromicrofarads |
| **70** | 0.1 microfarads |
| Inductor **25** | 18 microhenry |
| Transistors **20** | 2N3694 |
| **30** | 2N3694 |
| **40** | 2N4249 |
| **45** | 2N3694 |
| **62** | 2N3694 |
| MOS FET **67** | 3N128 |
| Diodes **29** | FD222 |
| **42** | FD222 |

What is claimed is:

1. Apparatus for varying the amplitude of chrominance subcarrier frequency signals, transmitted with a composite television signal during a color transmission, applied between a first chrominance selective amplifier and output means without substantially varying the phase of said signals, comprising, a. a first transistor amplifier arranged in a common base configuration having a low emitter input terminal impedance, b. first means coupling said emitter input terminal to the output terminal of said first selective amplifier stage, c. a second transistor, having a base, collector and emitter electrode, arranged in a common emitter configuration, and having said collector electrode coupled to the base electrode of said first transistor, d. second means coupled to said base electrode of said second transistor responsive to said chrominance subcarrier frequency signals for operating said second transistor during a color transmission to provide a voltage at the collector electrode of said second transistor for biasing on said first transistor, e. a unidirectional current conducting device, having a variable impedance according to the amount of current flowing therethrough coupled between said first means and a point of reference potential, and f. means coupled to said unidirectional device for controlling the current therethrough and therefore the impedance thereof, to cause said chrominance signals as applied to said emitter input terminal of said first transistor to decrease accordingly, whereby because of said low impedance of said emitter input terminal said decrease in chrominance signal amplitude is substantially free of phase variations.

2. The apparatus according to claim 1 wherein said unidirectional current conducting device comprises, a. a seminconductor diode having an anode to cathode path coupled between said first means and a point of reference potential.

3. The apparatus according to claim 1 wherein said means coupled to said unidirectional device for controlling the current therethrough, comprises a. a field effect transistor arranged in a source follower configuration and having a source electrode coupled to said unidirectional device, b. means coupled to the gate electrode of said field effect transistor for selectively varying the voltage at said source electrode to thereby control the current through said unidirectional device.

4. Apparatus for varying the amplitude of chrominance subcarrier frequency signals, transmitted with a composite television signal during a color transmission, said apparatus included in a television receiver including a detector for detecting the presence of an oscillatory burst transmitted only during said color transmission for providing a control voltage at an output terminal thereof, comprising, a. a first transistor amplifier arranged in a common base configuration having a low emitter input terminal impedance, b. means coupled to said emitter input terminal for applying said chrominance subcarrier frequency signal thereto, c. means coupled between said detector output terminal and said base electrode of said first transistor amplifier for biasing said amplifier in a linear mode during said color transmission in accordance with the presence of said control voltage, d. a variable impedance device coupled between said emitter electrode and a point of reference potential, said device having an impedance magnitude which varies in accordance with the current flowing therethrough, and e. means coupled to said variable impedance device for varying the current therethrough and therefore the impedance to control the amplitude of said chrominance signal applied to said emitter terminal in accordance with said current through said variable impedance device.

5. The apparatus according to claim 4 wherein said means coupled between said detector and said base electrode of said first transistor amplifier comprises a. a second transistor amplifier arranged in a common emitter configuration and having a base electrode coupled to said output terminal of said detector and a collector electrode, including clamping means, coupled to said base electrode of said first transistor, for clamping said base at a predetermined bias when said detector provides said control voltage at said output terminal thereof.

* * * * *